United States Patent [19]

Ludden

[11] Patent Number: 4,879,457
[45] Date of Patent: Nov. 7, 1989

[54] METHOD FOR ETCHING A BAR CODE ON METAL

[76] Inventor: Richard Ludden, 6030 Adams St., Lincoln, Nebr. 68507

[21] Appl. No.: 282,586

[22] Filed: Dec. 12, 1988

Related U.S. Application Data

[63] Continuation-in-part of Ser. No. 114,066, Oct. 29, 1987, Pat. No. 4,791,284.

[51] Int. Cl.⁴ ............................................. G06K 19/02
[52] U.S. Cl. .................................... 235/487; 235/488
[58] Field of Search ................................ 235/487, 488

[56] References Cited

U.S. PATENT DOCUMENTS

| | | |
|---|---|---|
| 4,085,314 | 4/1976 | Schultz et al. |
| 4,327,283 | 4/1982 | Heyman et al. |
| 4,446,362 | 2/1984 | Heyman |
| 4,791,284 | 12/1988 | Ludden ............................. 235/487 |

FOREIGN PATENT DOCUMENTS

| | | |
|---|---|---|
| 0219369 | 4/1987 | European Pat. Off. |
| 1441982 | 7/1976 | United Kingdom |
| 2004385 | 7/1978 | United Kingdom |

OTHER PUBLICATIONS

Marking Methods, Inc. publication, "What is Electrochemical Etching?" (1986) pp. 1–4 and 12.
Instruction sheet entitled "I.N.T./Image 'n Transfer," (un-dated) 1 page.
Publication of GC Electronics, "P.T.S. Positive Transfer System Printed Circuit Board Marking System," (un-dated) 2 pages.
Advertisement of Monode Marking Products, Inc., (un-dated) three pages.
Advertisement of Lectroetch Company, (un-dated), three pages.
Lectroetch Company publication, "Electrochemical Marking Manual," (1971) pp. 1–21.
Dataproducts advertisement, "SI 480 SI Series Solid Ink Printers," 4 pages.

*Primary Examiner*—Harold I. Pitts
*Attorney, Agent, or Firm*—Spencer & Frank

[57] ABSTRACT

In one embodiment of a method for etching a bar code on a metal surface, a carrier web having elongated openings is prepared. These openings correspond in size and position to the dark bars of the bar code. The carrier web is adhesively attached to the metal surface so that fluid cannot seep between the web and the surface. The metal surface is then electrochemically etched through the openings in the web. In another embodiment, a conveyor belt moves supports for metal objects past a printer assembly which includes melted-resin printheads. These melted-resin printheads are similar to ink drop printers except molten droplets of resin are expelled rather than droplets of ink. The resin droplets harden upon contact with the metal to provide a resist pattern. A rectangular opening in a mask is positioned over the resist pattern, and etching is conducted through the opening and resist pattern. The etching employed is preferably electro-chemical etching.

13 Claims, 5 Drawing Sheets

METHOD FOR ETCHING A BAR CODE ON METAL

CROSS REFERENCE TO RELATED APPLICATION

This is a continuation-in-part of my copending application, Ser. No. 07/114,066, filed October 29th, 1987, which will issue as U.S. Pat. No. 4,791,284 on December 13th, 1988.

BACKGROUND OF THE INVENTION

The present invention relates to a method for etching a bar code on a metal surface, such as the surface of a tool.

A bar code is an array of bars which are marked parallel to one another on a surface and which have various thicknesses to encode information such as characters and/or numbers. The encoded information can be optically read, or converted into electrical signals for use by a computer or other circuitry, using a hand-held wand or a counter-installed scanner. The Universal Product Code is a bar code that is familiar to most people in the United States because it has been adopted as a standard by the food industry, and is frequently printed on labels for cans or boxes of prepackaged food. In one version of this code, ten digits can be encoded to identify such features as the manufacturer, brand, and size. Specifications for the Universal Product Code establish the number and thickness of the bars needed to encode these ten digits, together with other information such as stop and start codes and a check digit. Despite the ubiquity of the Universal Product Code in the grocery field, however, specifications have been published to provide formats for other bar codes. For example Code 39, which has been adopted by the United States Department of Defense and which is being increasingly used by industry, employes 18 bars to encode 6 digits and ancillary information.

The digits permitted by a particular bar code format might be encoded using pen and ink by a draftsman who pays close attention to the code specifications. However it is far more frequent to use a bar code printer. Bar code printers are available which employ keyboards for manual input of the data to be encoded. One such bar code printer is the C. Itoh Model CI-800, which is available from CIE Terminals, Inc., 2505 McCabe Way, Irvine, California 92714. Furthermore commercially-available programs for printing bar codes can be run on personal computer systems having dotmatrix printers.

Since the general utility of bar codes for encoding information is widely recognized, it is not surprising that attempts have been made to mark bar codes on metal surfaces. Such attempts have met with only limited success in practice. Marking a bar code on a metal surface using laser etching or mechanical abrasion requires expensive equipment, and moreover poor read-rates sometime result. A bar code printed on a sticker and adhesively attached to a metal surface is easily damaged even if a tough material is used for the sticker. Furthermore the label may become detached due to degeneration of the adhesive if the surface is exposed to high temperatures or harsh chemicals. A bar code might be painted on a metal surface through a suitable stencil which is pressed against the surface, but paint seepage between the metal surface and the stencil at the edges of bars would result in poor read-rates. Furthermore the paint might chip, further reducing readability, if the surface is subjected to rough treatment. One might attempt to reduce the chipping problem, when a stencil bearing a bar code is pressed against a metal surface, by marking the surface using electrochemical etching rather than paint, but bars with poorly defined edges and hence poor readability would still result.

Electrochemical etching is a technique that is widely used to mark numbers or letters on a metal surface. Both ferrous metals, including stainless steel, and non-ferrous metals such as aluminum, brass, and copper, can be marked using electrochemical etching, as can plated layers of chrome, nickel, etc. Using the conventional electrochemical etching technique, one first prepares a stencil bearing the desired numbers or letters. Except at regions within the outlines of the desired numbers or letters, the stencil is impervious to fluid. After the metal surface to be marked is thoroughly cleaned, a pad which is soaked in an electrolyte is used to press the stencil against the surface. One output terminal of a power supply is then connected to the metal, and the other terminal is connected to a conductive plate within the pad. If the power supply delivers alternating current, during one portion of the waveform metal is etched away from the surface, where the surface is exposed to electrolyte through the stencil, and during the other portion of the AC waveform the metal is re-deposited as an oxide. The resulting metal oxide deposit is tough, and is easily distinguished visibly from adjacent portions of the metal surface which have been protected from the electrochemical etching by the impervious regions of the stencil. Direct current may be used instead of alternating current, in which case metal is etched away from the surface but not redeposited as an oxide. Moreover the AC and DC techniques can be combined, so that the AC technique is used to deposit a metal oxide coating at the bottom of a recess which was produced using DC etching. The etching current is not critical, and typically ranges from one amper to thirty ampers. Electrochemical etching equipment, including stencil materials, power supplies, and suitable electrolytes for use with a wide range of metals, are commercially available. One such commercial source is Monode Marking Products, Inc., 23620 St. Clair Avenue, Cleveland, Ohio 44117.

SUMMARY OF THE INVENTION

An object of the invention is to provide a method for applying a durable and highly-readable bar code to a metal surface.

Another object of the invention is to provide a method for using electrochemical etching to apply a bar code to a metal surface, with a mask which is adhesively applied to the metal surface being used in order to prevent seepage of etchant at the edges of the bars.

Another object of the invention is to provide a method for applying a bar code to a metal surface by printing a resist pattern onto the metal surface, followed by etching the metal which is not protected by the resist.

In accordance with one aspect of the invention, these and other objects which will become apparent in the ensuing detailed description can be attained by providing a method in which a web having elongated openings corresponding to the dark lines or bars which are to be etched is adhesively applied to a metal surface, and electrochemical etching is conducted through the openings.

In accordance with another aspect of the invention, a metal object having a surface on which a bar code is to be etched is passed through a stenciling station, where a pattern of resist bars is printed on the metal surface. Thereafter the metal which is unprotected by the resist pattern is etched, preferably using electrochemical etching.

DESCRIPTION OF THE PREFERRED EMBODIMENTS

Figures 1, 2:
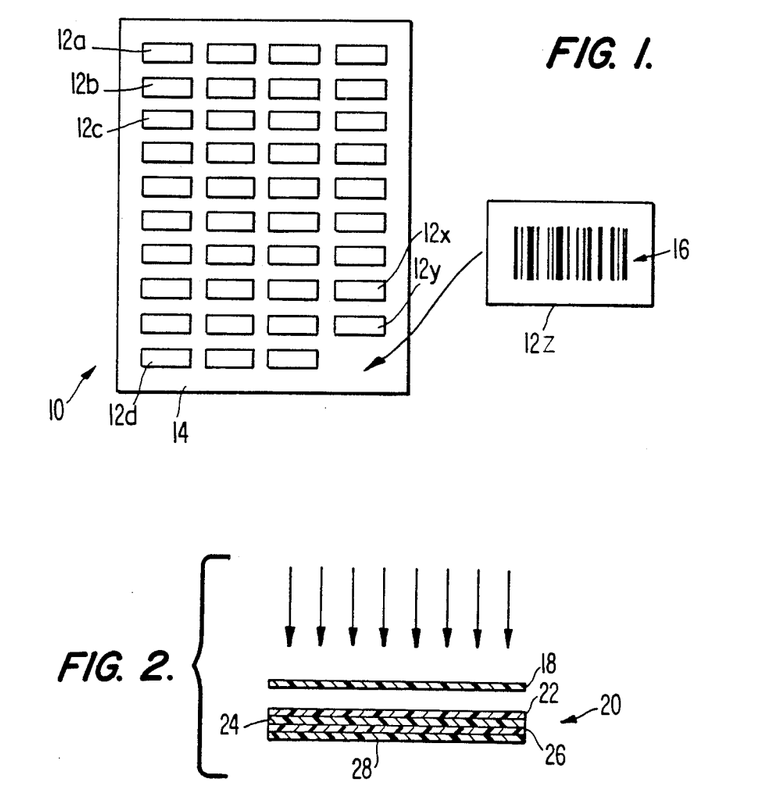
FIG. 1 is a plan view illustrating a master positive formed by 40 strips of paper bearing bar codes glued to a larger sheet of paper, each of the bar codes encoding different information.
FIG. 2 is a sectional view illustrating a sheet of transfer material and a positive transparency made from the master positive of FIG. 1, the transfer material having an adhesive layer of negatively-acting photosensitive substance which is exposed through the transparency.

In FIG. 1 a master positive 10 is formed by pasting 40 paper strips 12a, 12b, 12c, . . . , 12d, . . . , 12x, 12y, 12z in a 4×10 array on a paper support sheet 14. Printed on each of strips 12a . . . 12z is a bar code 16, although the bar code is only illustrated for sheet 12z. The bar codes 16 encode different information such as consecutive serial numbers. For example the bar code 16 on strip 12a might encode the serial number "000 001", the bar code 16 printed on strip 16b might encode the serial number "000 002", and so on up to the bar code 16 on strip 12z, which would encode the serial number "000 040."

The bar codes 16 may be printed on strips 12a . . . 12z using a conventional bar code printer. Although not illustrated, after the bar codes are printed additional indicia such as a trademark and the decimal equivalents of the encoded serial numbers can also be printed on the strips 12a . . . 12z.

Master positive 10 is used to make a secondary positive 18, shown in FIG. 2. This can be done by copying master positive 10 onto a transparent plastic sheet using a conventional office copier (not illustrated). As a result the 40 bar codes 16 are depicted on the secondary positive 18, and the quality of the bar codes 16 on secondary positive 18 may be checked if desired using a wand reader (not illustrated).

Reference number 20 designates a sheet of transfer material. Sheet 20 includes a transparent carrier 22, an adhesive layer 24 made from negative-acting photosensitive substance, an opaque coating 26, and a protective film 28. Transfer material 20 is commercially available from Esselte Pendaflex Corporation, 71 Clinton Road, Garden City, N.Y. 11530 under the trademark "LETRASET I.N.T." or "IMAGE AND TRANSFER." The material is frequently used in drafting and graphic arts departments for making artwork.

With continuing reference to FIG. 2, secondary positive 18 is placed in contact with carrier 22 of transfer material 20. Layer 24 is then exposed through positive 18 to ultraviolet light, illustrated schematically by the arrows in the Figure. The exposure may be made for 2.5 minutes using a 275 watt ultraviolet light spaced 12 inches from secondary positive 18. After the exposure, protective film 28 is stripped away from sheet 20, and then opaque coating 26 is washed away with water. Layer 24 is then developed to remove portions thereof that have been shielded from the ultraviolet light by the bars of bar code 16.

Figure 3:
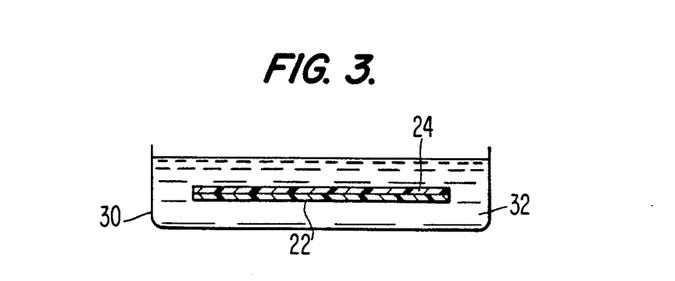
FIG. 3 is a sectional view schematically illustrating the photosensitive layer and a carrier in a tray of developer.
Figure 4:
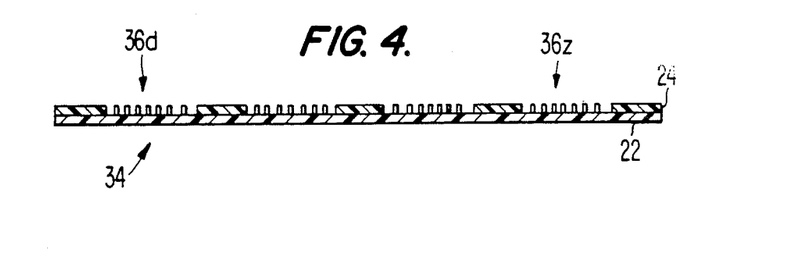
FIG. 4 is a sectional view schematically illustrating adhesive bar code masks on the carrier after development has been completed.

FIG. 3 illustrates the development step. Carrier 22 and layer 24 are placed in a tray 30 of "I.N.T." developer, which is commercially available from Esselte Pendaflex Corporation at the address given above. After standing in developer 32 for about 30 seconds, layer 24 is lightly rubbed with a cotton pad (not illustrated). After a few seconds the portions of layer 24 which have been protected from the ultraviolet light begin to come off. The rubbing and development continue until no further material can be removed from carrier 22. Carrier 22 and the remaining portions of layer 24 are then washed in water and dryed for at least an hour. The result is a sheet 34 of adhesive bar code masks as illustrated in FIG. 4. Sheet 34 is tacky, and unless it is to be used immediately for etching bar codes, as will be described below, should be protected by placing a protective film (not illustrated) on layer 24. Thus protected, sheet 34 has a shelf life of at least several weeks. Preferably, sheet 34 is used within six months.

With reference next to both FIGS. 1 and 4, it will be apparent that sheet 34 includes 40 bar code masks 3b (of which only masks 36d and 36z are individually identified), disposed in 4 columns of 10. Bar code mask 36d, for example, represents a negative of the bar code 16 on strip 12d, while bar code mask 36z represents a negative of the bar code 16 on strip 12z. That is, mask 36z has slots or apertures in layer 24 which correspond in position and dimensions to the black bars of the bar code 16 printed on strip 12z.

The use of an adhesive bar code mask 36 to electrochemically etch a bar code on a metal surface will not be described.

Bar code mask 36z, for example, is cut from sheet 34, and any protective film (not illustrated) that had previously been applied to layer 23 is removed. The metal surface which is to receive the bar code is then thoroughly cleaned to remove any rust, corrosion, dust, or other contaminants. Any oil or grease must also be removed, and 91 percent pure medical alcohol is suitable for this purpose.

Figure 5:
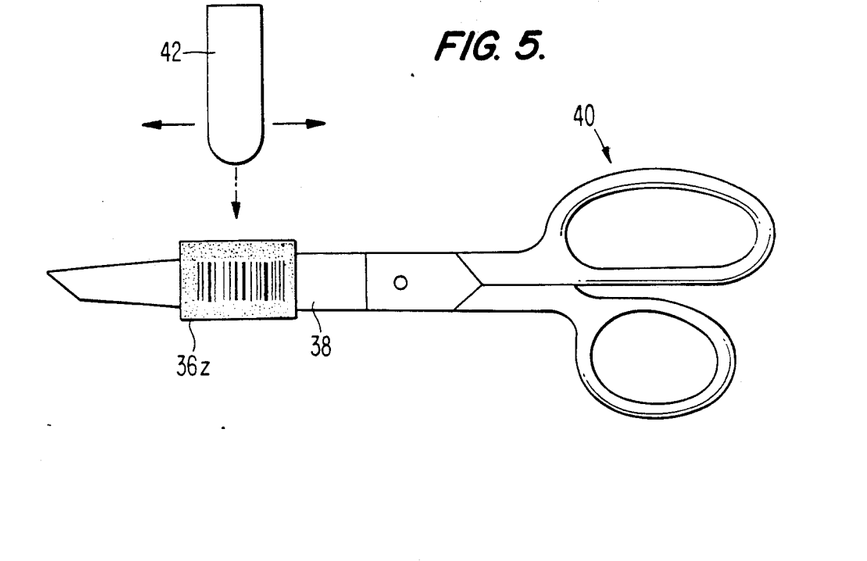
FIG. 5 schematically illustrates a pair of scissors and a burnishing tool which is used to affix a bar code mask cut from the sheet of FIG. 4.
Figure 6:
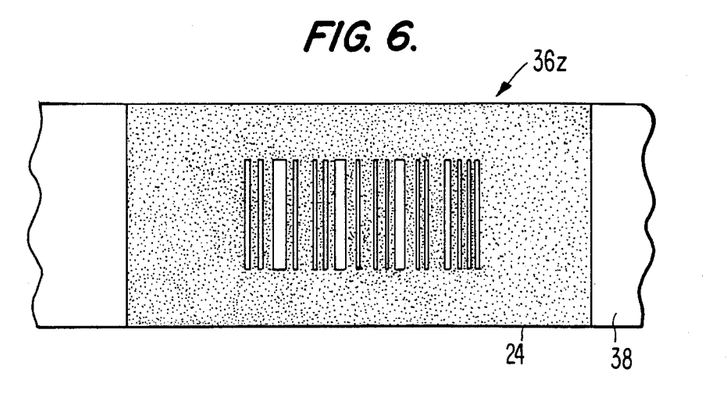
FIG. 6 is a top plan view, partially broken away, illustrating the mask adhesively affixed to a scissor blade.

In FIG. 5 the metal surface which is to receive the bar code is blade 38 of scissors 40. The mask 36z is placed on the prepared metal surface, with layer 24 contacting the metal surface. A burnishing tool 42 is then rubbed against the carrier 22 (see FIG. 4) of the mask 36z to press the adhesive layer 24 against blade 38. Carrier 22 is then peeled away, leaving the mask pattern provided by layer 24 affixed to the metal. This is illustrated in FIG. 6, which illustrates that the metal is exposed through apertures corresponding to the black bars of the bar code 16 printed on strip 12z (FIG. 1). Except at these apertures, blade 38 is sealingly coated with adhesive layer 24. It will be apparent that mask 36z is itself a negative of the original bar code 16. Electrochemical etching is a negative process, in the sense that unprotected areas become darkened by metal oxide. The result is that a negative image of the negative provided by mask 36z is deposited on blade 38, and this deposited negative image is the same as the original bar code 16 on strip 12z. No intervening negatives are needed despite the fact that transfer material 20 is traditionally exposed through a negative when it is used by graphic artists.

Figure 7:
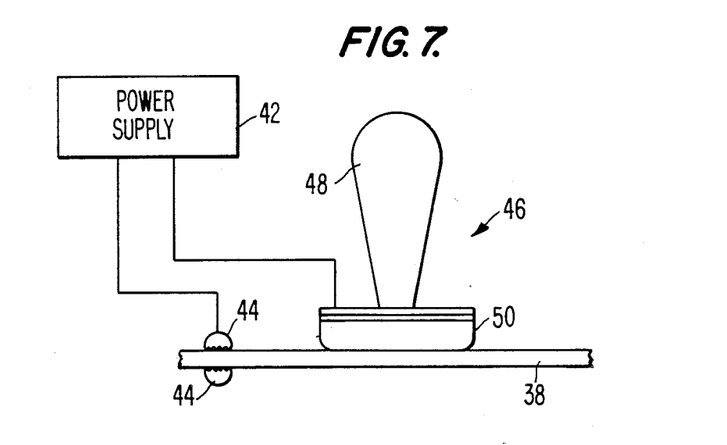
FIG. 7 schematically illustrates a side view of the scissor blade to which the mask is affixed, and equipment for electrochemical etching of the blade through the mask.

FIG. 7 illustrates the electrochemical etching step through the mask 36z that has been attached to blade 38. One terminal of a power supply 42 is electrically connected to blade 38 by way of an alligator clip having a pair of hinged jaws 44. The other terminal of power supply 42 is electrically connected to a metal plate (not illustrated) within an electrolyte applicator 46, which includes a handle 48 extending from a pad 50 saturated with a commercially-available electrolyte suitable for the metal that is being etched. If blade 38 is stainless steel, for example, "MSC 120" electrolyte, commercially available from Monode Marking Products, Inc., having an office at the aforesaid address, may be used. Applicator 46 is pressed toward blade 38 as power is provided from supply 42. To recess the bar code into the surface of blade 38, DC is first used to etch away unprotected metal. After the desired depth has been attained, AC is used to alternately etch metal and redeposit metal oxide. The DC etching depth is not critical and, in fact, DC etching need not be used at all. If DC etching is employed, neither the DC etching time nor the DC etching current is critical. A typical DC etching time would be fifteen seconds, at a current of fifteen amps. AC etching should be conducted long enough to provide a dense, opaque coating of metal oxide on the exposed metal. The AC etching time and current are not critical, but a typical AC etching time would be 5 to 10 seconds and a typical AC etching current would be 10 amps. These times and currents can be varied within wide ranges. In general, the etching time is reduced as the etching current is increased. The fact that mask 36z adheres to blade 38 permits the etching process to be interrupted for a visual check on how it is progressing. After the check, applicator 46 can be re-applied to blade 38 without fear that etching will resume at a displaced position.

Figure 8:
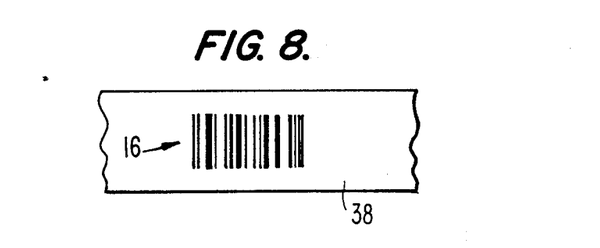
FIG. 8 is a plan view, partially broken away, of the bar code etched on the scissor blade.

After the electrochemical etching step has been completed, blade 38 is wiped with a pad (not illustrated) soaked in a solvent such as acetone to remove the layer 24. The metal oxide remains firmly attached, in the pattern of bar code 16 as illustrated in FIG. 8.

It will be apparent that the foregoing procedure may be modified in various ways. In particular, one need not start with a master positive 10 (see FIG. 1) of paper, and then proceed to a secondary positive 18 (see FIG. 2) using an office copier (other photographic or xerographic process). Instead, bar codes 16 may be printed from the start on transparent or translucent substrates, which are then affixed to a transparent or translucent support. It goes without saying that it is unnecessary to make an entire sheet 34 (see FIG. 4) of bar code masks unless they are all needed, and that the sheet 34 need not provide bar code masks which encode consecutive serial numbers. However since a major application of the present invention is to apply serial numbers to tools, such sheets of masks have the advantage of facilitating record keeping.

Figure 9:
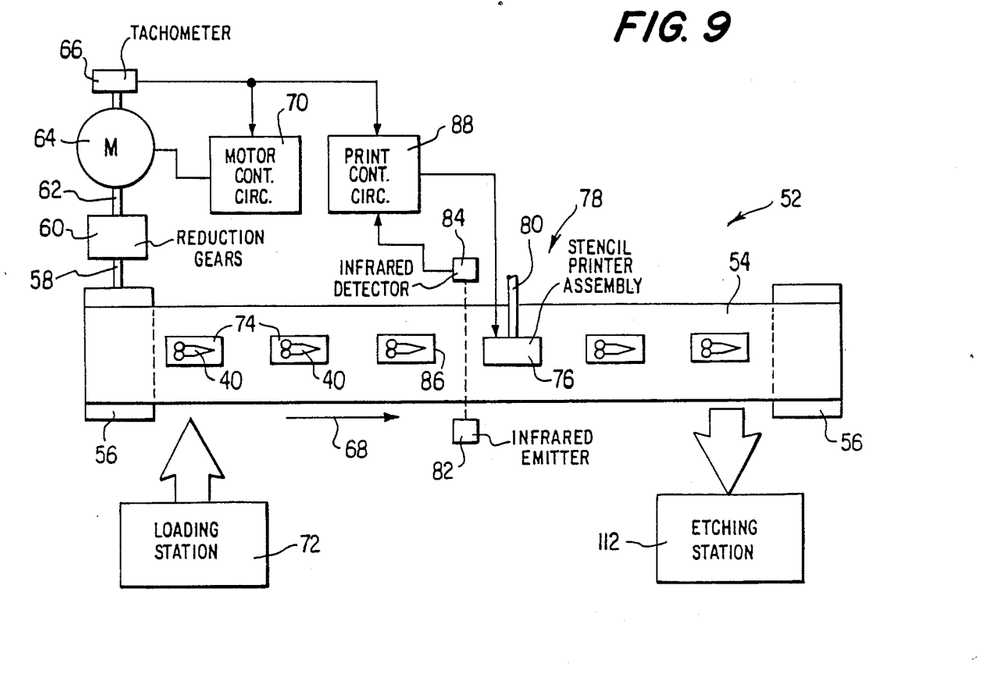
FIG. 9 is a top plan view schematically illustrating another embodiment of the invention, wherein a conveyor belt moves metal objects on which bar codes are to be etched passed a stenciling station, where resist patterns are applied before the metal objects reach an etching station.

Another embodiment of the invention will not be described with initial reference to FIG. 9.

In FIG. 9, a bar code etching system 52 includes a conveyor belt 54 which is stretched between rollers 56. One roller has a shaft 58 which is connected to a speed reduction gear box 60. The shaft 62 of motor 64 is connected to gear box 60 and to tachometer 66. Tachometer 66 produces a pulse train having a frequency which is a function of the angular velocity of motor shaft 62. That is, when motor 64 is running steadily, tachometer 66 produces a predetermined number of evenly spaced pulses for each revolution of motor 64. Accordiingly, it will be apparent that the position of belt 54 as it advances in the direction illustrated by arrow 68 can be determined by counting the tachometer pulses. Furthermore, the tachometer pulses are provided as a feedback signal to motor control circuit 70, which regulates the speed of motor 64 and thus the speed of belt 54.

At loading station 72, supports 74 which carry scissors 40 are deposited on belt 54 at spaced-apart intervals. The supports 74 are positioned so that their longitudinal axes run beneath a stencil printer assembly 76 at a stenciling station 78. Printer assembly 76 is fixedly supported above belt 54, at a height which barely clears scissors 40, by a mounting arm (only partially shown) 80. An infrared emitter 82 is positioned at one side of belt 54 and emits a beam that is received by infrared detector 84. This beam is broken when the front end 86 of a support 74 moves between emitter 82 and detector 84, thereby providing a positioning signal to printer control circuit 88. It will be apparent that the beam is broken when a support 74 is a predetermined distance from printer assembly 76.

Figure 11A:
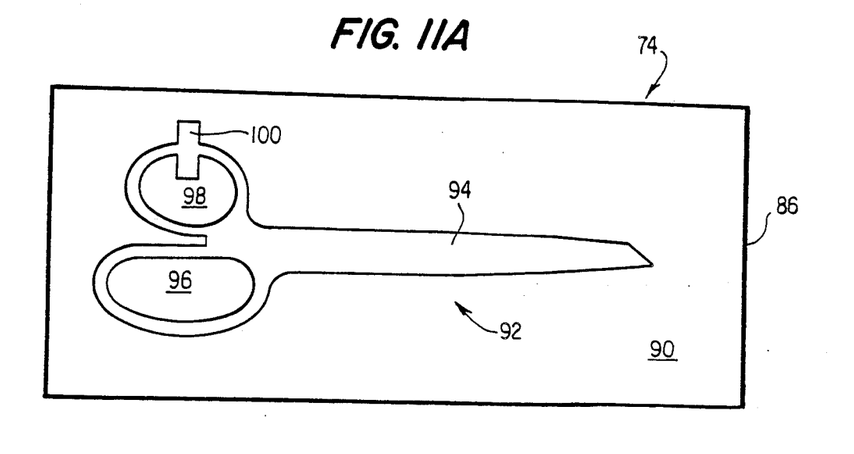
FIG. 11A is a top plan view illustrating a support having a recess for receiving a metal object on which a bar code is to be etched, the metal object in this case being scissors.

FIG. 11A illustrates the top surface 90 of a support 74. Surface 90 has a recess 92 with a bottom surface 94 which is configured to hold a pair of scissors inserted into recess 92 in the desired position for printing. The desired position is such that the upper surface of the upper scissors blade, at least where the bar code is to be etched, is parallel to top surface 90 and extends slightly above top surface 90. In short, recess 92 is configured so that the region where the bar code is to be etched is uniformly spaced beneath printer assembly 76 as belt 54 advances the support 74. Recess 92 loops around island 96 and 98, which have flat upper surfaces that are even with the rest of top surface 90. Islands 96 and 98 protrude through the handles of scissors 40 when scissors 40 are mounted in recess 94. Recess 94 includes an electrical attachment portion 100.

Figure 11B:
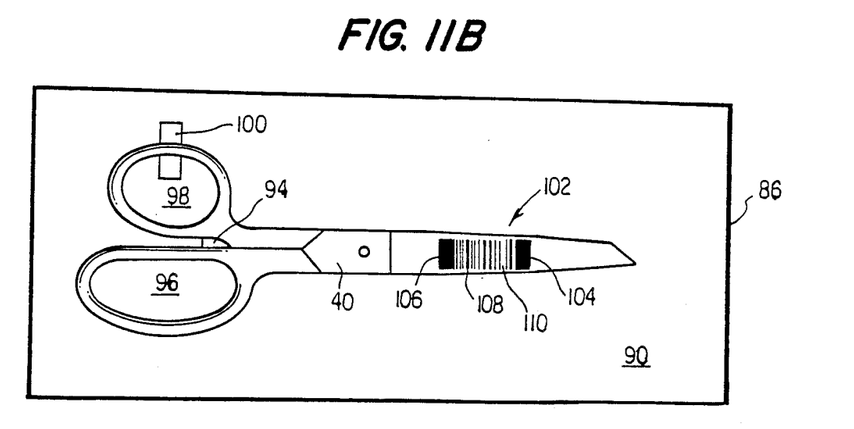
FIG. 11B is a top plan view showing scissors in the recess of the support shown in FIG. 11A, and illustrates a resist pattern which has been printed on the scissors blade.

Referring next to FIGS. 9 and 11B together, as scissors 40 are carried beneath printer assembly 76, printer control circuit 88 drives stencil printer assembly 76 to print a resist pattern at a predetermined position with respect to the front end 86 of the support 74, and thus with respect to the point of the scissors 40. In FIG. 11B the resist pattern 102 is generally rectangular, and includes a leading guard portion 104 and a trailing guard portion 106. Between the guard portions 104 and 106 are resist lines, such as resist line 108, having thicknesses which depend upon the information to be encoded in the bar code. The resist lines protect the underlying metal during subsequent etching. Between the resist lines are spaces, such as space 110, where the metal is exposed. It is these spaces that are etched and provide the dark bars in the final bar code. Printer assembly 76 is similar to an ink drop printer, except that droplets of melted resin are ejected rather than droplets of a solvent-based ink. The resin, which is somewhat waxy and impervious to etchant, hardens when it contacts the scissors 40. suitable print heads are commercially available from Dataproducts Company, 6200 Canoga Avenue, Woodland Hills, California 91365, under the "Solid Ink" trademark. A meltable resinous ink is also available from this company. Although the commercially available ink is pigmented, since the present embodiment of the invention relies upon the etchant-retarding property of the resin rather than its visual properties, it will be apparent that the pigment could be omitted.

Figure 11C:
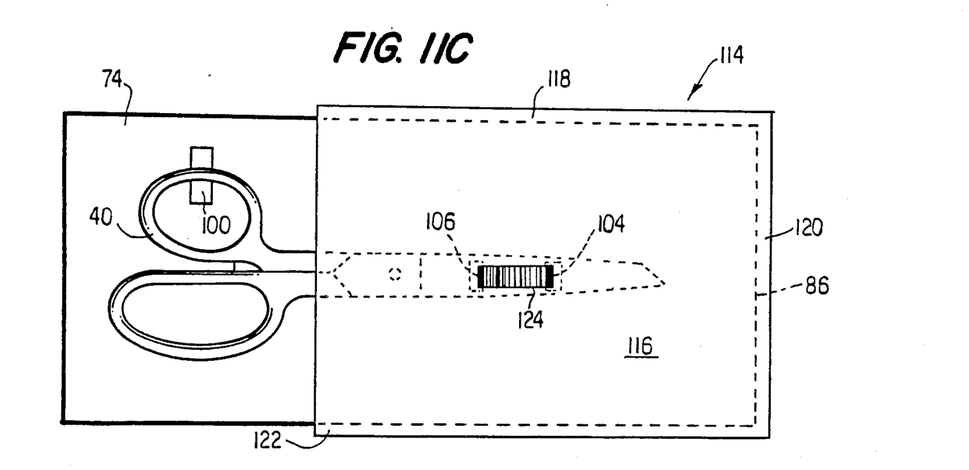
FIG. 11C is a top plan view showing an etching mask which has been inserted over the support and scissors shown in FIG. 11B.

Referring next to FIGS. 9 and 11C, after passing beneath printer assembly 76 the supports 74 and scissors 40 are transferred from belt 54 to an etching station 112. Although the etching may be purely chemical in nature, with paint being deposited in the resulting recesses to provide contrast,the etching conducted at station 112 is preferably electrochemical etching. To accomplish this, a mask enclosure 114 having a top wall 116 and three downwardly-extending walls 118, 120, and 122 is inserted over support 74. Wall 120 is positioned snugly against front end 86 of support 74, and walls 118 and 122 snugly receive the sides of support 74. Top wall 116 has a rectangular mask opening 124 which is positioned so as to expose most of resist pattern 102. However the ends of the resist lines (e.g., 108) are not exposed, and furthermore the ends of guard portions 102 and 104 are shielded. Accordingly, mask opening 124 presents a defined rectangular region for electrochemical etching. The electrochemical etching can be conducted through mask opening 124 using the equipment schematically illustrated in FIG. 7, with the jaws 44 of the alligator clip shown in FIG. 7 extending into electrical connection portion 100 of recess 92. After etching in the previously described manner, the scissors 40 are removed from support 74, which is then returned to loading station 72 (FIG. 9).

In a conventional printer or typewriter, typically a piece of paper is held stationary while a line is printed, and a printhead reciprocates while printing the line. During this process electrical information regarding the position of the printhead relative to the paper is needed, and this information can be derived from a tachometer or other sensor connected to the motor which moves the printhead. In contrast to this typical printing arrangement, in etching system 52 (FIG. 9) the printer assembly 76 is stationary and it is the objects which receive the printing (e.g., scissors 40) that move. Nevertheless, a similar printer synchronization procedure can be employed. This will be explained in more detail with reference to FIG. 10.

Figure 10:
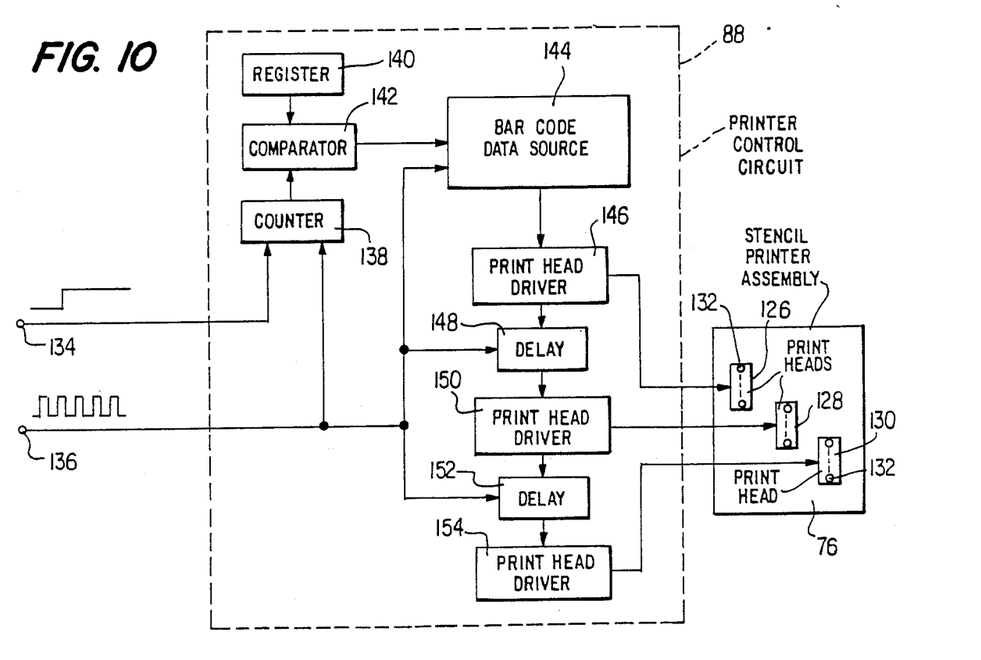
FIG. 10 is a schematic block diagram illustrating the printer control circuit and stencil printer assembly of FIG. 9.

FIG. 10 shows a circuit block diagram of the relevant portion of printer control circuit 88, and the underside of printer assembly 76. Printer assembly 76 includes three meltable-resin printheads 126, 128, and 130, each having a row of downwardly-directed resin nozzles 132. Only the first and last resin nozzles 132, schematically illustrated by small circles, are shown in FIG. 10 for each of the printheads. It will be seen that the printheads 126, 128, and 130 are arranged in a staggered fashion, with the three rows of resin nozzles shown being parallel to one another but being spaced apart by a predetermined distance. As a result, if all the resin nozzles 132 of printhead 126 were to simultaneously emit a dot and if the object which receives these dots were then advanced by the distance between printheads 126 and 128, the printhead 128 could then elongate the row of dots started by printhead 126. Further advancement of the object would permit printhead 130 to further extend the line of dots.

Printer control circuit 88 includes an input terminal 134 which is connected to infrared detector 84 and another input terminal 136 which is connected to tachometer 66. The signal received by terminal 136 is a pulse train having a frequency corresponding to the angular velocity of motor 64, and the signal received by terminal 134 becomes digitally "high" when the front end 86 of a support 74 breaks the beam between emitter 82 and detector 84. This transition resets counter 138 to zero, whereupon counter 138 begins counting pulses received from terminal 136. Each pulse corresponds to an incremental movement of belt 54. Register 140 stores a value corresponding to the number of such incremental movements in the distance between printer assembly 76 and the region of the scissors 40 to be printed when the beam is broken. After the scissors 40 have advanced by this distance, the content of counter 138 is equal to the content of register 140, and comparator 142 emits a signal to bar code data source 144. Data source 144 is similar to a conventional bar code printer in that it emits signals for controlling a printhead so as to produce a bar code which encodes the desired information. These signals are provided to printhead driver 146, which drives printhead 132 and thereby produces the top third of resist pattern 102. The signal from data source 144 also passes through a delay circuit 148, which may comprise shift registers clocked by the pulses received from terminal 136, and following the delay is provided to printhead 128 via printhead driver 150. The delay provided by delay circuit 148 compensates for the distance between printheads 126 and 128. A further delay circuit 152 is connected between driver 150 and a printhead driver 154, which drives printhead 130. Delay circuit 152 compensates for the distance between printheads 128 and 130, and delay circuits 148 and 152 together compensate for the distance between printheads 126 and 130. By using delay circuits in this manner the printheads 126–130 can be staggered as illustrated so that the nozzles 132 of each printhead can participate in forming the same resist line 108 (FIG. 11B). Such delays, each corresponding to a predetermined number of tachometer pulses and thus to a predetermined advance of belt 54, can also be accomplished using software rather than hardwired circuitry.

Figure 12:
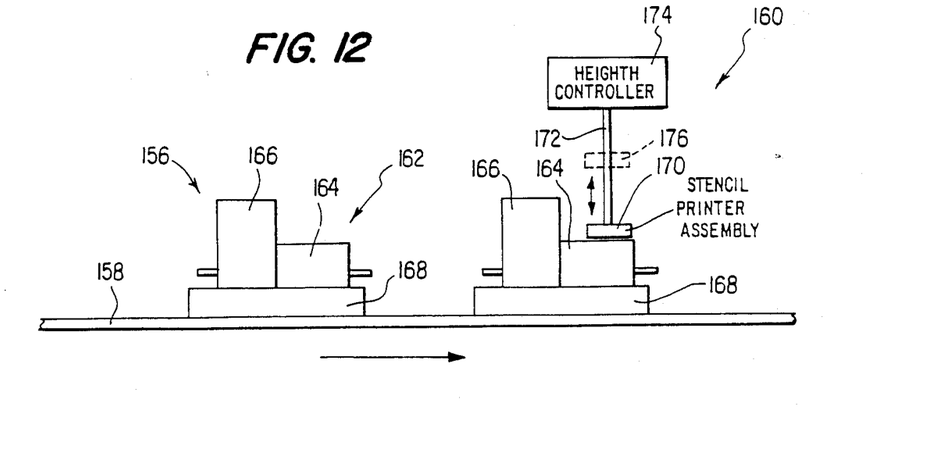
FIG. 12 is a side view, partially broken away, illustrating a portion of a belt and metal objects which the belt moves past a stenciling station which includes a stencil printer assembly that is raised and lowered.

FIG. 12 illustrates a portion of a bar code etching system 156 which includes a belt 158 and a stenciling station 160. The metal components 162 to be bar coded, such as automotive components, include a low portion 164 and a high portion 166. Supports 168 hold the components 162 so that a flat surface on low portion 164, where the bar code is to be deposited, is level. Stenciling station 160 includes a stencil printer assembly 170 which is mounted on an arm 172 moved by height controller 174. When the support 168 breaks a beam between an infrared emitter and an infrared detector (not shown in FIG. 12), controller 174 positions printer assembly 170 as shown in solid lines in FIG. 12. After the resist pattern has been deposited, controller 174 raises printer assembly 170 to the position shown by dotted lines 176. This permits the high portion 166 to move beneath the printer assembly 70.

It will be understood that the above description of the present invention is susceptible to various modifications, changes, and adaptations, and the same are intended to be comprehended within the meaning and range of equivalents of the appended claims.

What I claim is:

1. A method for etching a bar code having a plurality of dark bars on a metal surface, comprising the steps of:
   (a) preparing a carrier web having a plurality of elongated openings, each opening corresponding in size and position to a respective dark bar of the bar code;
   (b) adhesively attaching the carrier web to the metal surface, the adhesive attachment bonding the web to the metal surface so that fluid cannot seep between the web and the metal surface;
   (c) electrochemically etching the metal surface through the openings in the web, step (c) including electrochemically etching the metal surface using an AC current to produce a dark metal compound where the metal is exposed through the openings; and
   (d) removing the web from the metal surface.

2. The method of claim 1, wherein the web comprises a plastic layer and an adhesive layer, and wherein step (b) is conducted by pressing the web against the metal surface.

3. The method of claim 1, further comprising the step of preparing a sheet having a plurality of apertured regions, each apertured region having a plurality of elongated openings, and wherein step (a) is conducted by detaching an apertured region from the sheet.

4. The method of claim 1, further comprising the step of preparing a sheet having a plurality of apertured regions, each apertured region having a different pattern of openings, and wherein step (a) is conducted by detaching an apertured region from the sheet.

5. The method of claim 4, wherein the sheet has a plastic layer and an adhesive layer, and wherein step (b) is conducted by pressing the apertured region separated from the sheet against the metal surface.

6. A method for etching a bar code having a plurality of dark bars on a metal surface, comprising the steps of:
   (a) producing a relative movement between the metal surface and a printer;
   (b) using the printer to print a pattern of resist material on the metal surface, the pattern including parallel lines of resist material separated by spaces which correspond in size and position to the dark bars of the bar code;
   (c) etching the pattern of resist material; and
   (d) removing the resist material.

7. The method of claim 6, wherein step (c) is conducted by electrochemically etching the resist material.

8. The method of claim 7, further comprising the step of positioning an aperture in a mask over the pattern of resist material before the electrochemical etching step is conducted.

9. The method of claim 6, wherein the metal surface is provided by an object, and further comprising the step of placing the object in a support, and wherein step (a) is conducted by moving the support along a path which passes adjacent the printer.

10. The method of claim 9, wherein the printer is mounted adjacent a belt, and wherein the step of moving the support along a path is conducted by placing a support on the belt and moving the belt.

11. The method of claim 6, wherein the metal surface is provided an object, wherein step (a) is conducted by moving the object along a path which passes adjacent the printer, wherein the printer is movable between a first position and a second position, the first position being closer to the path than the second position, wherein the printer is in the first position as step (b) is conducted, and further comprising the step of moving the printer to the second position after step (b) has been completed.

12. The method of claim 6, wherein the printer comprises a melted-resin printhead, and wherein step (b) is conducted by propelling droplets of melted resin against the metal surface.

13. A system for etching bar codes on metal objects, each bar code having a respective plurality of dark bars, comprising:
   a melted-resin printhead;
   means for moving the objects along a path which passes adjacent the printhead;
   means for driving the printhead to print a respective pattern of resist material on each metal object, each pattern including parallel lines of resist material separated by spaces which correspond in size and position to the dark bars of the respective bar code; and
   means for etching the metal surface through the pattern of resist material.

* * * * *